(12) United States Patent
Smith et al.

(10) Patent No.: US 9,298,794 B2
(45) Date of Patent: Mar. 29, 2016

(54) SYSTEM AND METHOD FOR OFFLINE SYNCHRONIZATION OF EXCEPTION ITEMS OF SHARED SERVICES FOR CLIENT APPLICATIONS

(75) Inventors: Eric Smith, Redmond, WA (US); Cameron Stillion, Redmond, WA (US); Andrew Ash, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/164,408

(22) Filed: Jun. 20, 2011

(65) Prior Publication Data

US 2011/0252006 A1 Oct. 13, 2011

Related U.S. Application Data

(63) Continuation of application No. 11/599,206, filed on Nov. 14, 2006, now Pat. No. 7,966,426.

(51) Int. Cl.
*G06F 7/00* (2006.01)
*G06F 17/30* (2006.01)
*G06F 15/16* (2006.01)

(52) U.S. Cl.
CPC ................. *G06F 17/30578* (2013.01)

(58) Field of Classification Search
USPC .......... 709/203, 206, 217, 223, 248; 707/1, 2, 707/200, 201, 203; 715/511, 751; 455/560; 700/201, 203, 500
See application file for complete search history.

(56) References Cited

U.S. PATENT DOCUMENTS

| | | | |
|---|---|---|---|
| 5,490,270 | A | 2/1996 | Devarakonda et al. |
| 6,535,892 | B1 * | 3/2003 | LaRue et al. |
| 7,219,304 | B1 | 5/2007 | Kraenzel et al. |

(Continued)

FOREIGN PATENT DOCUMENTS

WO WO 2004012094 2/2004

OTHER PUBLICATIONS

"Microsoft Office 2003 Editions, Product Guide, Sep. 2003", Microsoft, http://www.jmu.edu.computing/news/archives/issues/2003guide.pdf, pp. 1-168.

(Continued)

*Primary Examiner* — Chris Parry
*Assistant Examiner* — Alan S Chou
(74) *Attorney, Agent, or Firm* — Danielle Johnston Holmes; Micky Minhas

(57) ABSTRACT

Application Programming Interfaces (APIs) and UI modifications for existing applications are used to implement efficient methods for taking content offline with full synchronization, incremental synchronization, in the case of document libraries per-folder synchronization, and the like. The APIs provide support for synchronizing changes to attachments, the ability to download a document library's complete contents or only a list of the available documents, and read-only folder hierarchy replication in the case of document libraries. These abilities coupled with corresponding user interface features enable easier browsing and searching of large document library structures, making edits to those documents offline, being able to see an up-to-date version of those documents in a preview mode, and receiving reminders when offline edits remain on the local computer and need to be updated to a server.

20 Claims, 5 Drawing Sheets

(56) References Cited

U.S. PATENT DOCUMENTS

| | | | |
|---|---|---|---|
| 7,296,035 B2 | 11/2007 | Polan et al. | |
| 7,360,082 B1 | 4/2008 | Berthold et al. | |
| 7,421,659 B2* | 9/2008 | Estrada et al. | 715/751 |
| 7,546,286 B2 | 6/2009 | Dickinson et al. | |
| 7,966,426 B2 | 6/2011 | Smith et al. | |
| 7,991,637 B1* | 8/2011 | Guiheneuf et al. | 705/7.18 |
| 8,166,101 B2* | 4/2012 | Shah | 709/203 |
| 2001/0044805 A1* | 11/2001 | Multer et al. | 707/201 |
| 2002/0083145 A1 | 6/2002 | Perinpanathan | |
| 2002/0099727 A1 | 7/2002 | Kadyk et al. | |
| 2002/0138582 A1 | 9/2002 | Chandra et al. | |
| 2003/0041076 A1* | 2/2003 | Lucovsky et al. | 707/500 |
| 2003/0158947 A1 | 8/2003 | Bloch et al. | |
| 2003/0233404 A1 | 12/2003 | Hopkins | |
| 2004/0058710 A1* | 3/2004 | Timmins et al. | 455/560 |
| 2004/0064484 A1 | 4/2004 | Polan et al. | |
| 2004/0064570 A1 | 4/2004 | Tock | |
| 2004/0201604 A1 | 10/2004 | Kraenzel et al. | |
| 2005/0066086 A1 | 3/2005 | Ramanathan | |
| 2005/0076085 A1 | 4/2005 | Budd et al. | |
| 2005/0102370 A1* | 5/2005 | Lin et al. | 709/217 |
| 2005/0144312 A1 | 6/2005 | Kadyk et al. | |
| 2005/0177617 A1* | 8/2005 | Banginwar et al. | 709/203 |
| 2005/0210079 A1* | 9/2005 | Edlund et al. | 707/204 |
| 2005/0222971 A1* | 10/2005 | Cary | 707/1 |
| 2006/0064634 A1* | 3/2006 | Dettinger et al. | 715/511 |
| 2006/0080363 A1 | 4/2006 | Vadlamani et al. | |
| 2006/0095447 A1 | 5/2006 | Dickinson et al. | |
| 2006/0123088 A1* | 6/2006 | Simmons et al. | 709/206 |
| 2006/0136511 A1* | 6/2006 | Ngo et al. | 707/203 |
| 2006/0161516 A1* | 7/2006 | Clarke et al. | 707/2 |
| 2006/0206570 A1 | 9/2006 | Heidloff et al. | |
| 2006/0206583 A1 | 9/2006 | Hill | |
| 2007/0016632 A1 | 1/2007 | Schulz et al. | |
| 2007/0100978 A1* | 5/2007 | Levi et al. | 709/223 |
| 2007/0156659 A1 | 7/2007 | Lim | |
| 2007/0180075 A1* | 8/2007 | Chasman et al. | 709/223 |
| 2007/0226218 A1 | 9/2007 | Chatterjee et al. | |
| 2008/0066148 A1 | 3/2008 | Lim | |
| 2008/0082660 A1 | 4/2008 | Bachmann et al. | |
| 2008/0140732 A1 | 6/2008 | Wilson et al. | |
| 2008/0208919 A1* | 8/2008 | Dalfo et al. | 707/201 |
| 2008/0243948 A1* | 10/2008 | Guiheneuf et al. | 707/203 |
| 2008/0263103 A1* | 10/2008 | McGregor et al. | 707/200 |
| 2010/0235613 A1* | 9/2010 | Baldwin | 712/244 |

OTHER PUBLICATIONS

"Microsoft Office Outlook 2007 Product Overview", 2007 Microsoft Office System Preview Site, Published May 23, 2006, http://www.microsoft.com/office/preview/programs/outlook/overview.mspx, pp. 1-5.

Pabla, Chandandeep, "SyncML Intensive", IBM Apr. 1, 2002, pp. 1-9.

U.S. Appl. No. 11/599,206, filed Nov. 14, 2006, Amendment and Response filed Oct. 27, 2009, 11 pgs.

U.S. Appl. No. 11/599,206, filed Nov. 14, 2006, Amendment and Response filed Nov. 22, 2010, 16 pgs.

U.S. Appl. No. 11/599,206, filed Nov. 14, 2006, Amendment and Response filed Apr. 5, 2010, 15 pgs.

U.S. Appl. No. 11/599,206, filed Nov. 14, 2006, Final Office Action mailed Jan. 5, 2010, 21 pgs.

U.S. Appl. No. 11/599,206, filed Nov. 14, 2006, Non-Final Office Action mailed Jul. 21, 2010, 31 pgs.

U.S. Appl. No. 11/599,206, filed Nov. 14, 2006, Non-Final Office Action mailed Jul. 27, 2009, 16 pgs.

U.S. Appl. No. 11/599,206, filed Nov. 14, 2006, Notice of Allowance mailed Feb. 14, 2011, 13 pgs.

\* cited by examiner

SYSTEM AND METHOD FOR OFFLINE SYNCHRONIZATION OF EXCEPTION ITEMS OF SHARED SERVICES FOR CLIENT APPLICATIONS

RELATED APPLICATIONS

The present application is a continuation application of and claims priority to U.S. patent application Ser. No. 11/599,206, entitled "Offline Sharing Capability for Client App lcation," filed Nov. 14, 2006, now issued U.S. Pat. No. 7,966,426, which is incorporated herein, by reference in its entirety.

BACKGROUND

Multi-functional, multi-application sharing services are one of the new trends in software industry. Increasingly, applications for electronic mail, browsing, word processing, and the like, coordinate and share data through a central shared services entity. This enables multiple users to share documents, interact while working with a particular application, and so on.

A typical approach for sharing systems is allowing individual users to work with content from a shared services entity when a connection to a share server is accessible. This commonly limits activities, such as saving documents to a computer user's desktop or exporting a document to a format based on a different standard, to a less rich, typically read-only experience. While offline, users often need to perform actions on the offline content, which means they then have to cumbersomely import or drag-and-drop the data into the local application before they can complete their workflow.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to methods for taking content offline with different synchronization modes, ability to synchronize changes to attachments, ability to download a document library's complete contents or a list of the available documents from a share server employing integrated or separate client side Application Programming interfaces (APIs). Client applications are enabled to provide browsing and searching of shared document library structures, offline editing of shared documents and scheduling of synchronizations with one or more share servers.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, APIs and UI modifications are provided to implement efficient methods for taking content offline with various synchronization modes, the ability to download a document library's complete contents or only a list of the available documents, and read-only folder hierarchy replication in the case of document libraries. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art. will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program. of instructions for executing a computer process.

Figure 1:
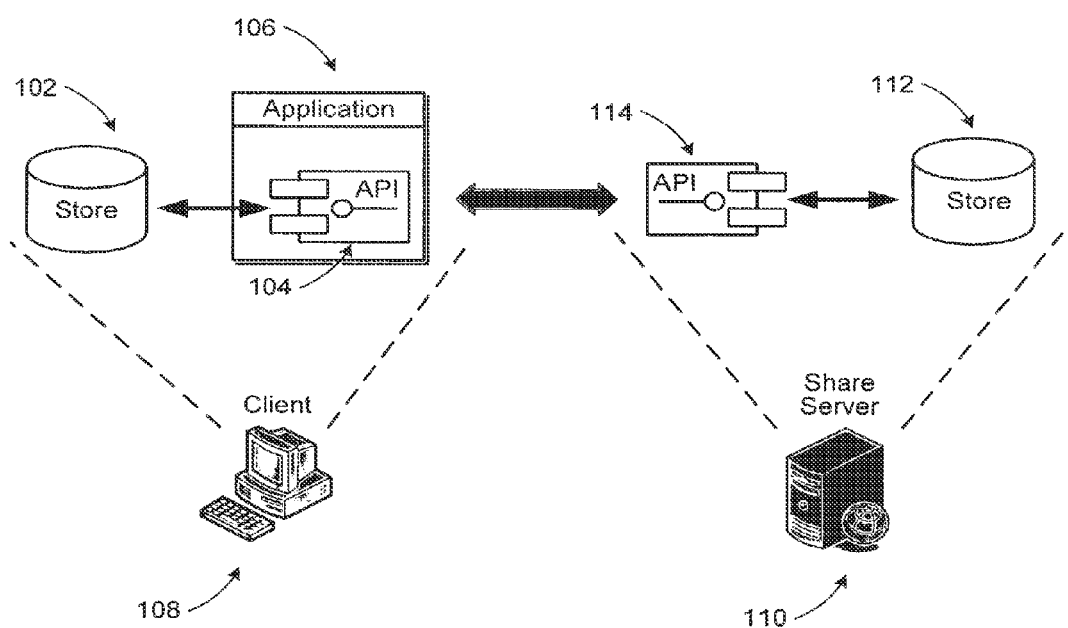
FIG. 1 illustrates a conceptual diagram of interactions between a client application and a share server through APIs according to embodiments.

Referring to FIG. 1, a conceptual diagram of interactions between a client application and a share server through APIs is illustrated. While examples are described using particular applications such as an electronic mail application below, embodiments may be implemented in any client application that interacts with a share service. Such applications may include, but are not limited to, browsing applications, word processing applications, spreadsheet applications, and the like.

In an operation, share server 110 stores data (documents, files, data chunks, and the like) in data store 112 and coordinates sharing through API 114. Client application 106 resides on client device 108 and may be an electronic mail application, a browsing application, and the e like. Client application 106 may include API 104, which may be an integral part of the client application. API 104, according to some embodiments, coordinates downloading and translation of data from share server 110, storing of the downloaded data in client data store 102, and makes it available to client application 106. If changes are made to the data, API 104 coordinates uploading of the data to the share server for synchronization.

According to embodiments, one or more client APIs are used to implement efficient methods for taking content offline with full synchronization, incremental synchronization, in the case of document libraries per-folder synchronization, and the like. The APIs may provide support for synchronizing changes to attachments, the ability to download a document library's complete contents or only a list of the available documents, and read-only folder hierarchy replication in the case of document libraries. These abilities coupled with corresponding user interface features enable easier browsing and searching of large document library structures, making edits to those documents offline, being able to see an up-to-date version of those documents in a preview mode, and receiving reminders when offline edits remain on the local computer and need to be updated to a server.

Using APIs and user interfaces such as those mentioned above, experiences in an electronic mail application (e.g. Outlook® by MICROSOFT CORP. of Redmond, Wash.) may allow content like calendars, contact lists, task lists, discussion hoards (posts that work like e-mail), and document libraries to be connected to Outlook through a simple user action, and be synchronized for offline access in the background. In addition to the above-listed capabilities, offline read/write synchronization for above listed and other content may also he supported.

In atypical electronic share service data exists in its own Personal Folder Storage (PST). The PSI store is opened in read mode for standard e-mail activities, When the data is synchronized down to the PSI, a separate read-write instance is opened using a background shared Messaging Application Programming Interface (MAPI) session. In an electronic mail program according to embodiments, a read-write session may be opened on the PST and the user interface may layer checks and enforce access.

When linking shared items (e.g. contacts, calendars, tasks, messages, documents, etc) a check is performed if a PST for the share service folders already exists. If the PST does not exist, one that is to be used for the particular provider may be created, but it can be used for all data types associated with the particular share service. To determine if a PST already exists, an entry identifier of the store in the profile is used.

In one implementation, each share service list that is synchronized down to the electronic mail application exists in its own folder. A name of the folder may be assigned by using the name of the list appended to the site name. Uniqueness may be guaranteed by appending (x) to the name, where x is the next free number. All data related to the event list like a Uniform Resource Locator (URL), a Globally Unique Identifier (GUID), a site name, etc. may be stored in an associated message on the folder. To uniquely link the folder to the list, the GUID and the User ID stored on the associated message may be compared. The User ID may be a predetermined character for regular lists and an associated character for Group Calendar if associated with a user (e.g. −1 for the lists and a positive number for the Group Calendar).

For a synchronization process, make a Simple Object Access Protocol (SOAP) call may be made first requesting the change log and specifying a change token. A new change token is received from the share server along with the change log. According to one embodiment, the change log, which may be returned to clients in XML form, gives changes by their text names. The ID of the item may be an integer. For example, a delete may be sent as: <Id ChangeType="Delete">3<Id>. If the log indicates an item was deleted, then the item may also be deleted from the PST.

if changes are made at the local client application, another SOAP call may be made to the server, specifying the list GUID, and the same change token used to request the change log. The server may also send back a response that contains a list. This list may include a row of data corresponding to each list item. If an item does not exist in the PST, it may be created at that point. Then, differences and merge conflicts may be reconciled and any local changes uploaded to the share server. Following the reconciliation, a list containing a row of data corresponding to each list item may be constructed. Having client changes does not necessarily change the system behavior when making the change log SOAP call. A connection between having client changes and making the SOAP call is implied where none exists. Client changes are relevant to reconciliation, but download may occur the same either way.

According to one embodiment, the client application (e.g. electronic mail application) may be responsible for conflict resolution. Because all uploads are done after downloads and the client application is responsible for conflict resolution, no items can be uploaded if the download fails. If the client application proceeds to upload items without finishing the download, an important conflict might be missed. Hence, the order of downloads followed by uploads minimizes the risk of conflict overlook.

Folder level synchronization of document libraries is also provided according to embodiments. While a typical synchronization process may involve coordinating a list to a folder, document libraries present an exception. The hierarchy of document libraries may also be synchronized in an application according to another embodiment. Moreover, portions of the hierarchy may also be synchronized selectively according to a further embodiment.

Some desktop applications such as OFFICE® from MICROSOFT CORP. of Redmond, Wash. use two types of checkout: simple-offline and checked-out. When a document is checked out, the server remembers that a user has a lock on that document and other users are not allowed to change it. When a document is in the simple-offline state, other users can check out and edit the file because the server has no knowledge of simple offline. When a program like a word processing, spreadsheet, or presentation application detects that the current file is simple-offline and the server is available, that program prompts to turn the simple-offline into a real checkout. While a document is checked out, the document has a registry key identifying: a type of checkout, a server modification time of that version of the file, a URL to the server version of the file, and a filename and a path of the file on the user's hard drive. For example, the registry key may look like:

HKEY_CURRENT_USER\Software\Microsoft\Office\Common\Offline\Files

This information is used by the program to detect what files have server copies and whether the server version has been updated since the file was taken offline. In order to set up the simple offline scenario, a new registry key may be written for the file within:

HKEY_CURRENT_USER\Software\Microsoft\Office\12.0\Common\Server Drafts

The new registry key is the filename of the simple-offline file and holds the server modified time and the URL of the file. An application could also get the modification time from another API and not HTTP GET and the time can be just as valid. The client application then launches the desktop program (e.g. word processing, spreadsheet, or presentation application) and that program checks the registry to see if the current file matches any simple-offline files.

Thus, the client application does not need to check in or check out documents. The client application only reflects their state and provides a cache for the user to open and preview documents. Once a file is in the checked-out or simple-offline state, the client application pulls in the file from the user's hard drive instead of from the server.

As noted above, the registry keys for checkout and simple-offline contain one URL. As a result, alternate URLs do not work in this scenario. The checkout code on the share server and the desktop program may not be able to handle files with several URLs that happen to resolve to the same endpoint. According to other embodiments, the API may recognize and use alternative URLs resolving to the same endpoint. Thus, when a share server is out of capacity or down, an alternative server may he used for synchronization and uploading operations without the user experiencing disruption.

An exception leads to a difference in what is a "change" to the recurring item between the client application and the share server. When the share server only changes the exception, the series still needs to change on the client application. This humps the version of the series in the client application and can cause false conflicts if the series is updated on the share server later.

In order to minimize false conflicts and extra uploads, the client application may track the last-downloaded version history of items such as appointments in an electronic mail application in a separate property. So, when an exception-only change arrives, the client application may bump the version of the master, but remember that this version bump was a result of a server change. If the series changes on the server, then the client application knows that the last version received was from the server by comparing the last-synchronized version GUM with the current one. if they match, then the user has not made changes and no conflict should result.

If the user has made a change to a series but conflicts with a server change the client application does not know whether the user has changed the same server item, because client exception and series changes may look the same to version history. To prevent potential data loss, the client application may create a conflict item from the user's item. If the server only changed an exception, then the client application may upload the conflict-winner series to the server.

Embodiments are not limited to the above described example programs and methods. Offline sharing capability may be provided to various applications using the principles described herein. For example, any client application using a MAPI may be able to implement the features discussed here.

Figure 2:
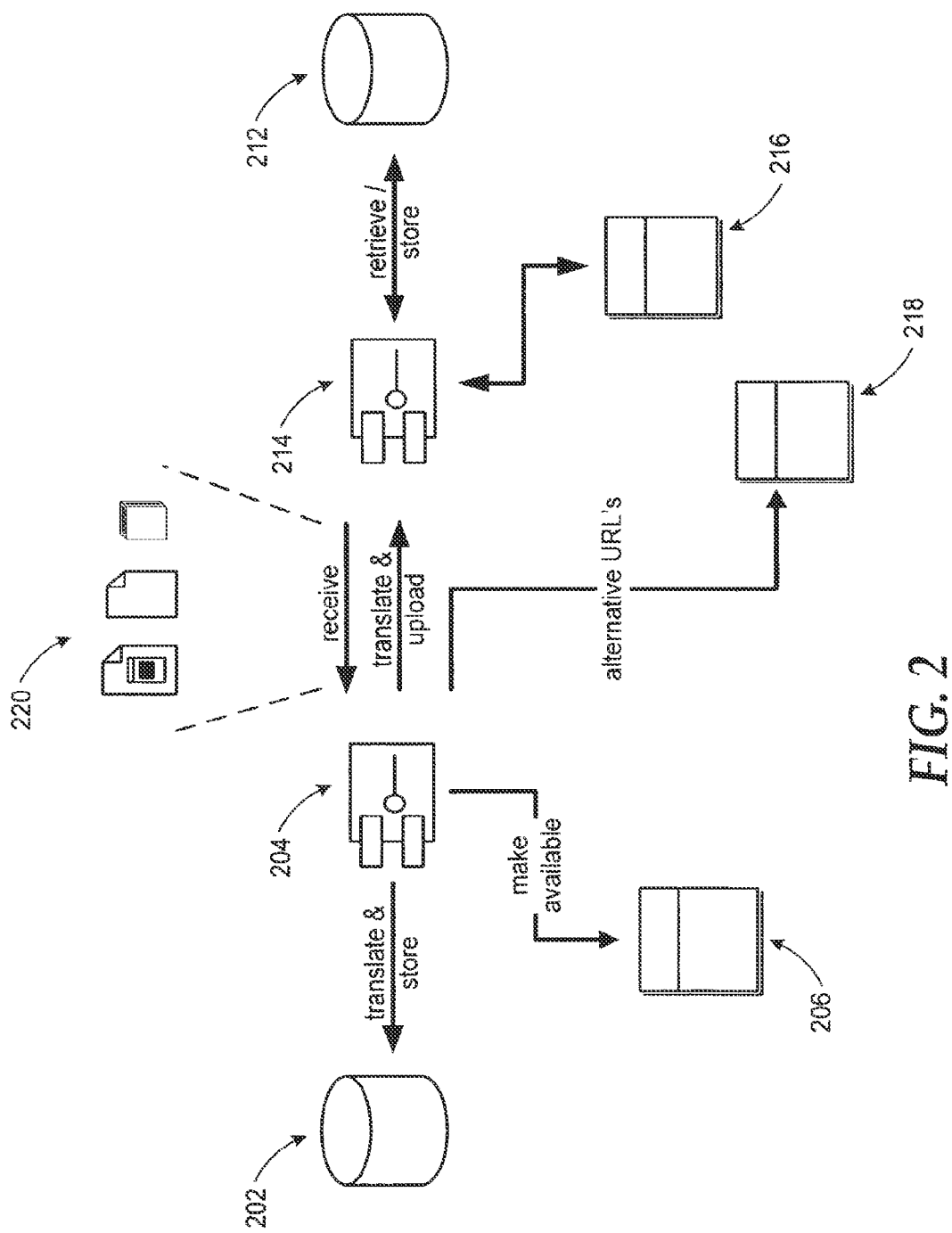
FIG. 2 illustrates a detailed diagram of an example sharing system with offline editing and synchronization capability.

FIG. 2 illustrates a detailed diagram of an example sharing system with offline editing and synchronization capability. On the client side of the sharing system illustrated in FIG. 2, API 204 coordinates downloading, synchronization, and uploading of data with a share service that may utilize multiple share servers such as server applications 216 and 218.

Shared data is stored in sharing system data store 212, which may include one or more data stores, virtual or physical. API 214 operates together with (or may be an integral part of) server application 216. In an operation, API 214 retrieves data from server data store in response to a request from client application 206 through API 204. API 204 receives the data 220, which include files, documents, embedded documents, attached documents, data chunks, and the like. API 204 then translates the data to a format usable by client application 206 and stored in local data store 202.

In typical electronic mail applications, embedded or attached documents commonly exist in volatile memory when they are opened directly from the received message. In an implementation according to embodiments, embedded or attached documents are actually stored in hard drive and made available to client application 206 for consumption. When updates are made to the data, API 204 translates it to the preferred format of the share server application 216 and uploads to the share server through API 214.

According to other embodiments, the sharing system may include multiple share servers/server applications for redundancy, increased capacity, optimization, and the like. In that case, alternative URLs may be used to synchronize the data. In an enterprise network, synchronization to extranet servers may also be provided through alternative URLs.

According to further embodiments, sharing attributes of embedded or attached documents may be reflected within the user interface of the client application such as the electronic mail application allowing the system to bring the sharing features to the electronic mail application experience. Furthermore, through the use of version history, as described previously, multi-master version control may be accomplished within the sharing system.

Embodiments are not limited to the illustrated examples and architectures in FIG. 1 and FIG. 2. Other architectures may be implemented using the principles described herein.

Figure 3:
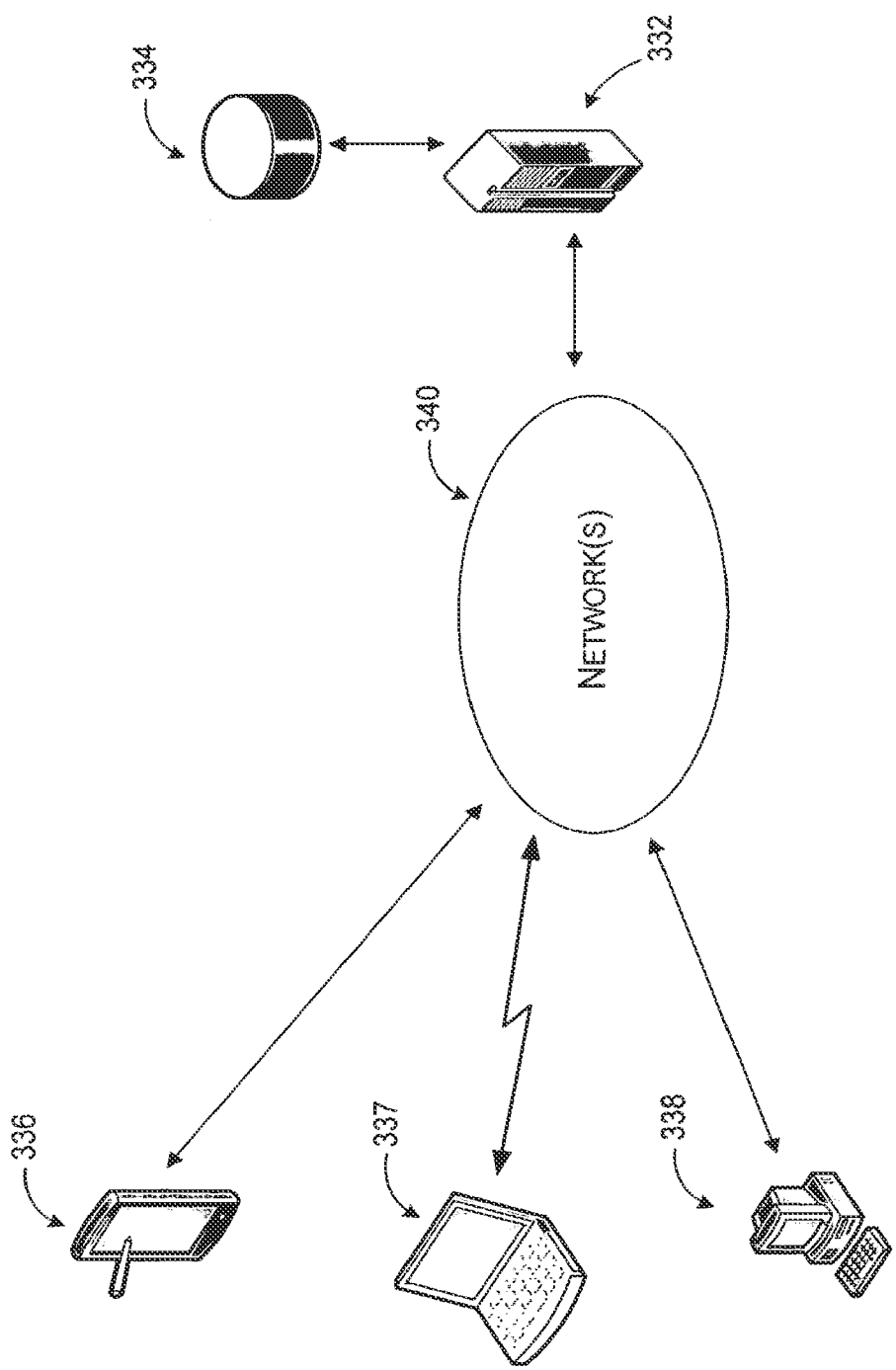
FIG. 3 illustrates an implementation of a sharing system with offline editing and synchronization capability in a networked environment.
Figure 4:
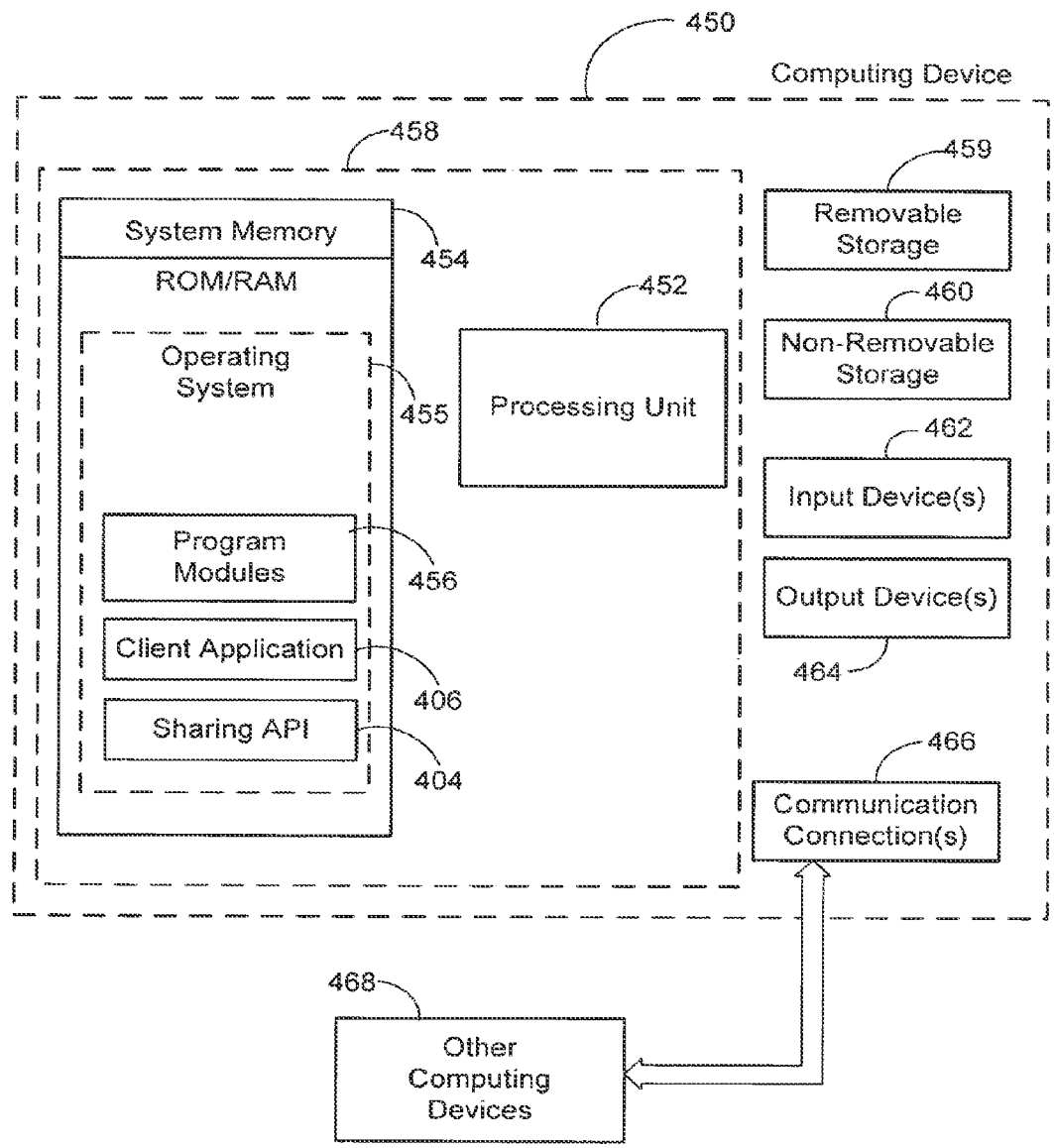
FIG. 4 is a block diagram of an example computing operating environment, where embodiments may be implemented.

Referring now to the following figures, aspects and exemplary operating environments will be described. FIG. 3, FIG. 4, and the associated discussion are intended to provide a brief, general description of a suitable computing environment in which embodiments may be implemented.

Figure 5:
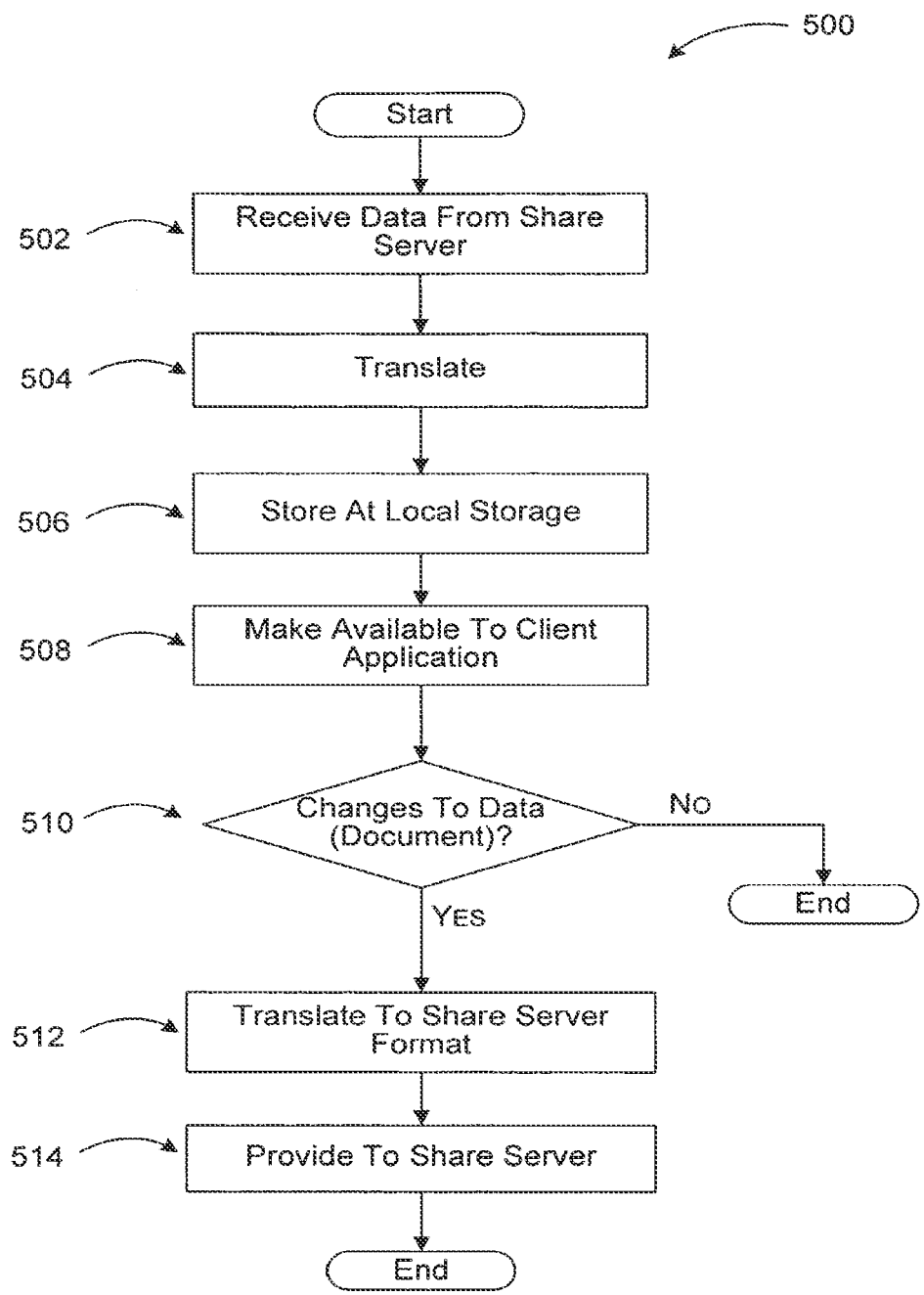
FIG. 5 illustrates a logic flow diagram for a process of sharing data with a share server at a client application.

FIG. 5 illustrates an implementation of a sharing system with offline editing and synchronization capability in a networked environment. The system may comprise any topology of servers, clients, Internet service providers, and communication media. Also, the system may have a static or dynamic topology. The term "client" may refer to a client application or a client device employed by a user to perform operations associated with accessing a networked system. While a sharing system with offline editing and synchronization capability may include many more components, relevant ones are discussed in conjunction with this figure.

Client devices 336-338 represent any computing device that may include a client application such as an electronic mail application that may share data through a sharing system. The sharing system may be managed by share server 332, which stored shared data in data store 334, Data store 334 may include one or more data stores, such as SQL servers, databases, non multi-dimensional data sources, file compilations, data cubes, and the like. The data may be exchanged by APIs on client side and server side through network(s) 340. Share server 332 may include additional programs with various functionalities for managing the sharing system. Such programs may include testing programs, repair programs, security applications, and the like. Some or all of these programs may also reside in the individual computing devices and be executed locally. Furthermore, share server 332 may comprise multiple servers, multiple applications on one or more servers, and the like, Network(s) 340 may include a secure network such as an enterprise network, an unsecure network such as a wireless open network, or the Internet. Network(s) 340 provide communication between the nodes described herein. By way of example, and not limitation, network(s) 340 may include wired media such as a wired network or direct-wired connection, and wireless media such as acoustic, RF, infrared and other wireless media.

Many other configurations of computing devices, applications, data sources, data distribution and analysis systems may be employed to implement a sharing system with offline editing and synchronization capability. Furthermore, the networked environments discussed in FIG. 3 are for illustration purposes only. Embodiments are not limited to the example applications, modules, or processes.

With reference to FIG. 4, a block diagram of an example computing operating environment is illustrated, such as computing device 450. In a basic configuration, the computing device 450 typically includes at least one processing unit 452 and system memory 454. Computing device 450 may include a plurality of processing units that cooperate in executing programs. Depending on the exact configuration and type of computing device, the system memory 454 may be volatile (such as RAM), non-volatile (such as ROM, flash memory, etc.) or some combination of the two. System memory 454 typically includes an operating system 455 suitable for controlling the operation of a networked personal computer, such as the WINDOWS® operating systems from MICROSOFT CORPORATION of Redmond, Wash. The system memory 454 may also include one or more software applications such as program modules 456, client application 406, and sharing API 404.

As described previously in more detail, client application 406 receives and consumes shared data from a share server through sharing API 404. Sharing API 404 translates the data from the share server (not shown), stores it in a local data store such as removable storage 459 or non-removable storage 460, and makes it available to client application 406. Sharing API 404 further coordinates synchronization of the shared data. Sharing API 404, and any related engines may be an integrated part of client application 406 or operate remotely and communicate with the client application and with other applications running on computing device 450 or on other devices. Furthermore, sharing API 404 and client application 406 may be executed in an operating system other than operating system 455. This basic configuration is illustrated in FIG. 4 by those components within dashed line 458.

The computing device 450 may have additional features or functionality. For example, the computing device 450 may also include additional data storage devices (removable and/or non-removable) such as, for example, magnetic disks, optical disks, or tape. Such additional storage is illustrated in FIG. 4 by removable storage 459 and non-removable storage 460. Computer storage media may include volatile and non-volatile, removable and non-removable media implemented in any method or technology for stora of information, such as computer readable instructions, data structures, program modules, or other data. System memory 454, removable storage 459 and non-removable storage 460 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 450. Any such computer storage media may be part of device 450. Computing device 450 may also have input device(s) 462 such as keyboard, mouse, pen, voice input device, touch input device, etc. Output device(s) 464 such as a display, speakers, printer, etc. may also be included. These devices are well known in the art and need not be discussed at length here.

The computing device 450 may also contain communication connections 466 that allow the device to communicate with other computing devices 468, such as over a network in a distributed computing environment, for example, an intranet the Internet. Communication connection 466 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic. RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

FIG. 5 illustrates a logic flow diagram for a process of sharing data with a share server at a client application. Process 500 may be implemented in a sharing API, which may be part of a client application or a separate module.

Process 500 begins with operation 502, where data is received from the share server. The data may be received in response to a call from the client application as described previously. Processing advances from operation 502 to operation 504.

At operation 504, the sharing API translates the data into a format used by the client application, if the data is stored in a different format at the share server. Processing proceeds from operation 504 to operation 506.

At operation 506, the sharing API stores the translated data at a local storage. For example, a document attached to an e-mail message may be stored on the client hard drive before being made available to an application associated with the document. Processing moves from operation 506 to operation 508.

At operation 508, the data is made available to the client application. Processing advances from operation 508 to decision operation 510.

At decision operation 510, a determination is made whether any changes are made to the data by the client application or an associated application (e.g. a desktop application associated with an attached document). If there are no changes, the process may end or return to operation 502 to receive further data. On the other hand, if changes are made, processing proceeds to operation 512.

At operation 512, the modified data is translated to the format preferred by the share server before synchronization. Processing advances from operation 512 to operation 514.

At operation 514, the translated data is uploaded to the share server by the sharing API for synchronization. After operation 514, processing moves to a calling process for further actions.

The operations included in process 500 are for illustration purposes. sharing data with offline edit and synchronization capability may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for resolving a conflict during client side offline editing at a client, the method comprising:
storing a series locally at a client cache, wherein the series comprises a recurrence item and an exception item, wherein the exception item comprises a change to an instance of the recurrence item, and wherein each of the recurrence item and the exception item are calendar items, wherein the series is associated with a first URL and an alternate URL;
receiving a change to the exception item of the series by a server at the client, wherein the first URL resolves to the server;
increasing a master version for the exception item at the client;
receiving a request to check out a recurrence item at the client, wherein, upon receiving the request, the client pulls the recurrence item from the client cache instead of from the server;
changing the recurrence item of the series in response to a change made at the client, wherein the change includes a series version of the client;
comparing the master version to the series version;
upon determining that the master version and the series version are not the same, determining that the series version is the client-side conflict winner;
attempting to upload the change to the recurrence item of the series to the server to which the first URL resolves;
receiving an indication that the upload failed; and
uploading the change to the recurrence item of the series to an alternate server, wherein the alternate URL resolves to the alternate server.

2. The method of claim 1, wherein the series is an appointment series in an electronic mail application.

3. The method of claim 1, wherein the master version is stored in a separate property.

4. The method of claim 1, wherein the master version is a GUID.

5. The method of claim 1, wherein the series version is a GUID.

6. The method of claim 1, wherein the client side conflict winner is a conflict created from a client side user's item.

7. The method of claim 1, further comprising:
upon increasing the master version for the exception item, storing the change as a server side change at the client.

8. A computer implemented system comprising:
a processor; and
a memory communicatively coupled to the processor, the memory having computer-executable instructions that when executed by the processor provide a method for resolving a conflict during client side offline editing at a client, the method comprising:
storing a series locally at a client cache, wherein the series comprises a recurrence item and an exception item, wherein the exception item comprises a change to an instance of the recurrence item, and wherein each of the recurrence item and the exception item are calendar items, wherein the series is associated with a first URL and an alternate URL;
receiving a change to the exception item of the series by a server at the client, wherein the first URL resolves to the server;
increasing a master version for the exception item at the client;
receiving a request to check out a recurrence item at the client, wherein, upon receiving the request, the client pulls the recurrence item from the client cache instead of from the server;
changing the recurrence item of the series in response to a change made at the client, wherein the change includes a series version of the client;
comparing the master version to the series version;
upon determining that the master version and the series version are not the same, determining that the series version is the client-side conflict winner;
attempting to upload the change to the recurrence item of the series to the server to which the first URL resolves;
receiving an indication that the upload failed; and
uploading the change to the recurrence item of the series to an alternate server, wherein the alternate URL resolves to the alternate server.

9. The computer implemented system of claim 8, wherein the series is an appointment series in an electronic mail application.

10. The computer implemented system of claim 8, wherein the master version is stored in a separate property.

11. The computer implemented system of claim 8, wherein the master version is a GUID.

12. The computer implemented system of claim 8, wherein the series version is a GUID.

13. The computer implemented system of claim 8, wherein the client side conflict winner is a conflict created from a client side user's item.

14. The computer implemented system of claim 8, further comprising:
upon increasing the master version for the exception item, storing the change as a server side change at the client.

15. A computer storage device having computer executable instructions stored thereon which when executed by a processor cause the processor to perform a method for resolving a conflict during client side offline editing at a client, the method comprising:
storing a series locally at a client cache, wherein the series comprises a recurrence item and an exception item, wherein the exception item comprises a change to an instance of the recurrence item, and wherein each of the recurrence item and the exception item are calendar items, wherein the series is associated with a first URL and an alternate URL;
receiving a change to the exception item of the series by a server at the client, wherein the first URL resolves to the server;
increasing a master version for the exception item at the client;
receiving a request to check out a recurrence item at the client, wherein, upon receiving the request, the client pulls the recurrence item from the client cache instead of from the server;
changing the recurrence item of the series in response to a change made at the client, wherein the change includes a series version of the client;

comparing the master version to the series version;
upon determining that the master version and the series version are not the same, determining that the series version is the client-side conflict winner;
attempting to upload the change to the recurrence item of the series to the server to which the first URL resolves;
receiving an indication that the upload failed; and
uploading the change to the recurrence item of the series to an alternate server, wherein the alternate URL resolves to the alternate server.

16. The computer storage device of claim 15, wherein the series is an appointment series in an electronic mail application.

17. The computer storage device of claim 15, wherein the master version is stored in a separate property.

18. The computer storage device of claim 15, wherein the master version is a GUID.

19. The computer storage device of claim 15, wherein the series version is a GUID.

20. The computer storage device of claim 15, wherein the client side conflict winner is a conflict created from a client side user's item.

\* \* \* \* \*